United States Patent [19]

Sugiyama

[11] Patent Number: 5,206,737
[45] Date of Patent: Apr. 27, 1993

[54] FACSIMILE APPARATUS USING A SINGLE BI-DIRECTIONAL MOTOR TO CONTROL FEEDING OF AN ORIGINAL DOCUMENT AND A RECORDING PAPER WITH SELECTION BETWEEN PLURAL MODES OF OPERATION

[75] Inventor: Hideaki Sugiyama, Mishima, Japan

[73] Assignee: Tokyo Electric Co., Ltd., Tokyo, Japan

[21] Appl. No.: 864,522

[22] Filed: Apr. 7, 1992

[30] Foreign Application Priority Data

Apr. 15, 1991 [JP] Japan .................. 3-111027

[51] Int. Cl.⁵ .................. H04N 1/31; B41J 23/34
[52] U.S. Cl. .................. 358/296; 358/498; 400/185; 400/187
[58] Field of Search .............. 358/296, 498; 400/185, 400/186, 187

[56] References Cited

U.S. PATENT DOCUMENTS

| 4,280,145 | 7/1981 | Norrell | 358/489 |
| 4,649,437 | 3/1987 | Watanabe | 358/296 |
| 4,866,531 | 9/1989 | Kobori et al. | 358/296 |

*Primary Examiner*—Benjamin R. Fuller
*Assistant Examiner*—Scott A. Rogers
*Attorney, Agent, or Firm*—Frishauf, Holtz, Goodman & Woodward

[57] ABSTRACT

The apparatus for feeding recording paper according to the present invention includes a platen roller gear, a white roller gear, a forwardly/reversely rotatable motor, a gear train connected to the motor, a relay mechanism for transmitting a force from the gear train to the platen roller gear and white roller gear, and a switching mechanism. The relay mechanism has a driving gear constantly meshed with an output gear of the gear train, and a first driven gear constantly meshed with the driving gear and being capable of revolving around the gear. The relay mechanism has a second driven gear constantly meshed with the driving gear and being capable of revolving around the gear. The relay mechanism has a third driven gear constantly meshed with the first driven gear and being capable of revolving around the first driven gear. The switching mechanism stops movement of the first driven gear and releases the stop of movement. By combining the switching operation of the switching mechanism and the switching of rotational direction of the motor, a torque is transmitted to at least one of the platen roller gear and white roller gear via the relay mechanism, whereby paper can be fed in the transmission, reception and copy operation modes by a single motor and recording paper can be fed backwards in the reception and copy operation modes.

11 Claims, 8 Drawing Sheets

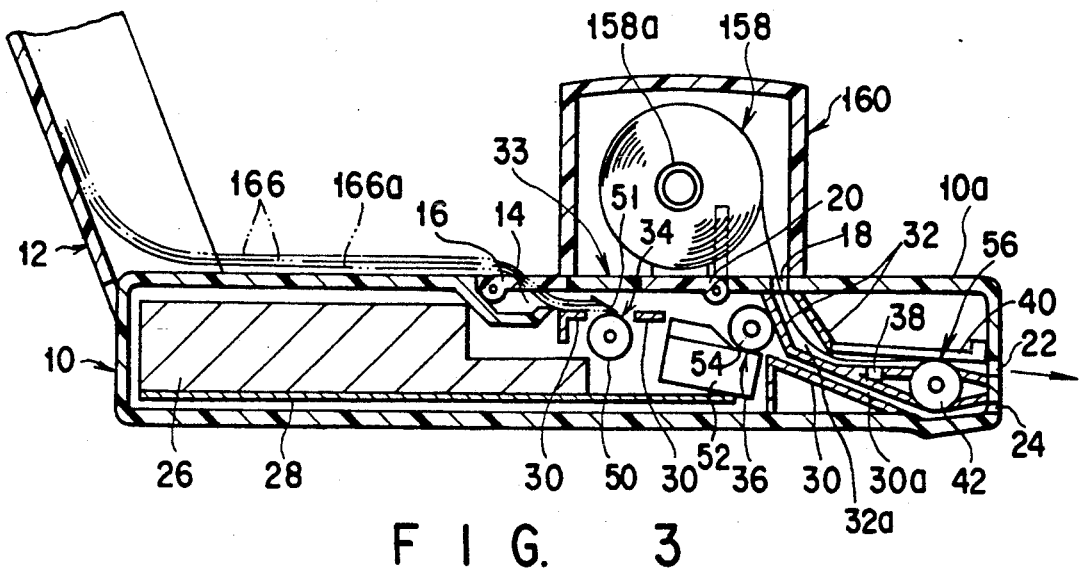
F I G. 3
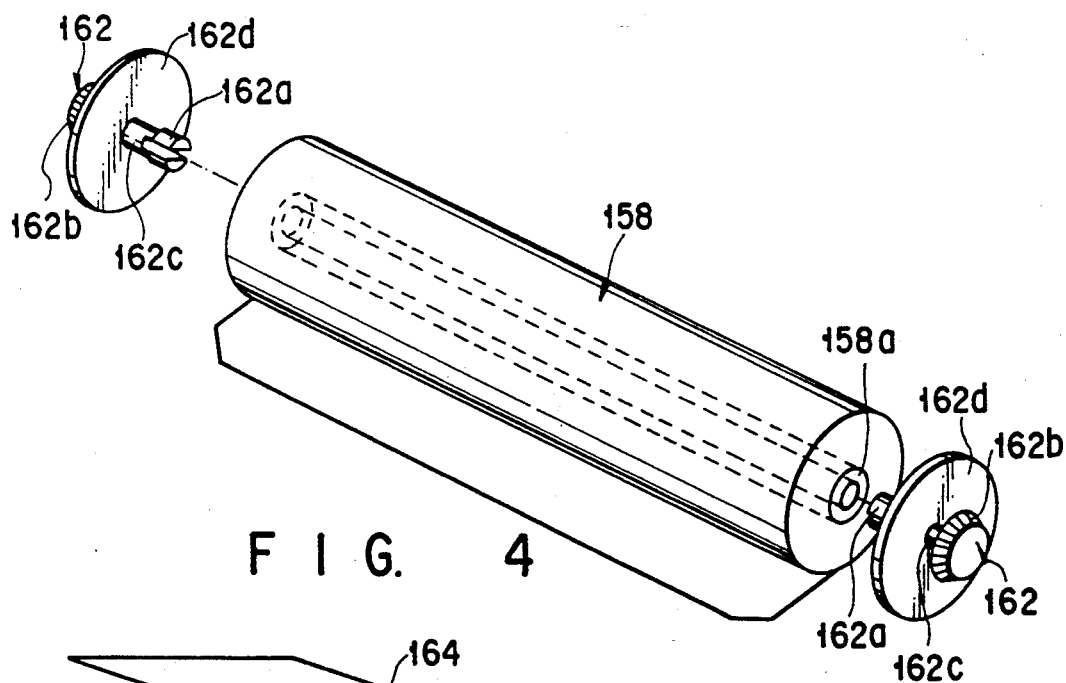
F I G. 4
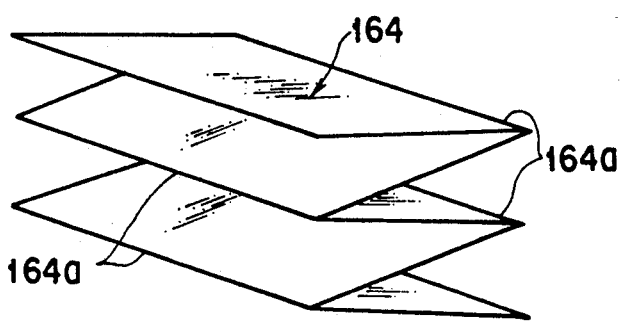
F I G. 5

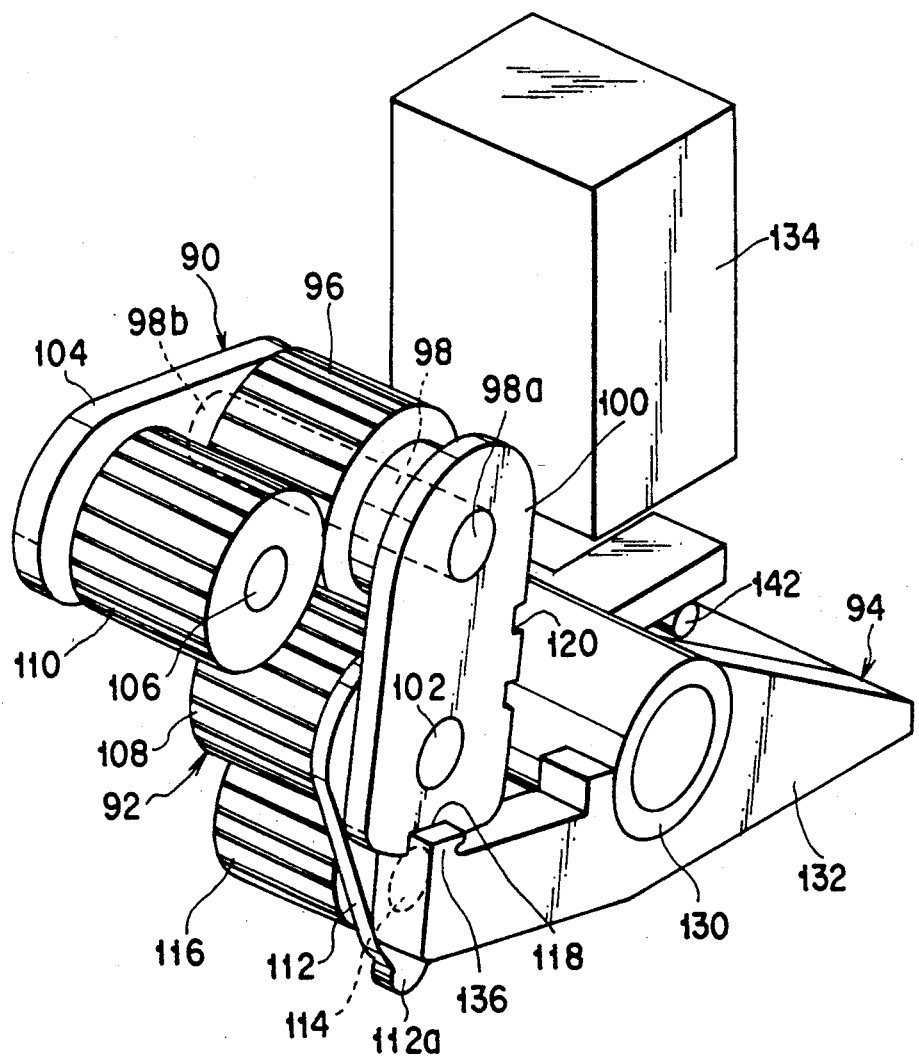
F I G. 11

FACSIMILE APPARATUS USING A SINGLE BI-DIRECTIONAL MOTOR TO CONTROL FEEDING OF AN ORIGINAL DOCUMENT AND A RECORDING PAPER WITH SELECTION BETWEEN PLURAL MODES OF OPERATION

BACKGROUND OF THE INVENTION

1. Field of the Invention

The present invention relates to an apparatus for feeding recording paper, which is provided, for example, in the casing of a facsimile apparatus and feeds the paper in a reception operation mode, a transmission operation mode and a copy operation mode of the facsimile apparatus.

2. Description of the Related Art

There is known a facsimile apparatus having a transmission operation mode, a reception operation mode and a copy operation mode. The technique of feeding recording paper or originals by using a single motor in the three operation modes of the facsimile apparatus is disclosed in Published Unexamined Japanese Patent Application (PUJPA) No. 63-148758 (corresponding to U.S. Pat. No. 4,866,531).

The motor used in this technique has an output shaft which is rotatable in a forward direction and a reverse direction. In the reception operation mode of the facsimile apparatus, the output shaft of the motor is rotated in one direction. This rotation is transmitted to a platen roller via a first one-way clutch, thereby feeding recording paper.

In the transmission operation mode of the facsimile apparatus, the output shaft of the motor is rotated in the other direction (opposite to the said one direction). This rotation is transmitted to a white roller having a white outer peripheral surface via a second one-way clutch. In the transmission operation mode, switching means is operated to transmit the rotation in the other direction to an ADF (auto document feeder) roller. The ADF roller feeds an original with an image to be transmitted. Accordingly, the original is fed by the white roller and ADF roller.

In the copy operation mode of the facsimile apparatus, the output shaft of the motor is rotated in one direction, and the rotation is transmitted to the platen roller via the first one-way clutch. In addition, since the switching means is operated in the copy operation mode, the rotation in one direction is transmitted to the ADF roller. Thus, both the platen roller and ADF roller are simultaneously rotated to feed the original and recording paper.

In the meantime, a roll of recording paper is generally used in the facsimile apparatus. The facsimile apparatus has a cutter (recording paper cutting means) for cutting the recording paper at desired length. The cutter and a recording unit are separated in the direction of feeding recording paper.

Consequently, each recording paper sheet cut by the cutter has a marginal portion corresponding to the distance between its delivery tip portion and the cutter.

Means for reducing the marginal portion is not employed in the recording paper feeding apparatus of PUJPA 63-148758. Thus, in the conventional apparatus, recording paper has a large useless marginal portion.

There is a case where continuous form recording paper is used. This recording paper has perforation lines at regular intervals in the longitudinal direction thereof. The paper is folded along the perforation lines. The continuous form recording paper is passed through the recording means and fed out of the body of the facsimile apparatus. Part of the paper, located outside the apparatus, is cut along the perforation line. The cut part is a paper sheet having a predetermined size.

Thus, there is a marginal portion between the perforation line, used for cutting the paper sheet, and the next perforation line. The marginal portion corresponds to the distance between the perforation line, used for cutting the paper sheet, and the recording means. Accordingly, the range of recording between the adjacent perforation lines of the continuous form recording paper is small, in relation to the predetermined size.

SUMMARY OF THE INVENTION

The object of the present invention is to provide an apparatus for feeding recording paper, wherein only one motor is used as a power source, a useless portion of recording paper can be reduced when a recording paper roll is used, and a recording range can be increased when continuous form recording paper is used.

This object can be achieved by an apparatus for feeding recording paper, comprising:

recording means, including a platen roller and a printing head between which recording paper is passed, for effecting recording on the recording paper;

original read means, including a white roller and an original read sensor between which an original is passed, for reading an image on the original by means of the original read sensor;

a single motor having a forwardly/reversely rotatable output shaft;

transmission means connected to the output shaft;

a platen roller gear fixed on the platen roller;

a white roller gear fixed on the white roller; and operation mode selection means including a relay mechanism, provided between the platen roller gear and the white roller gear, for transmitting a torque from the transmission means selectively to at least one of the platen roller gear and the white roller gear, and a switching mechanism having first and second operation positions which are selected to control the selection operation of the relay mechanism, wherein the white roller gear is rotated forwardly when the switching mechanism is in the first operation position and the output shaft is rotated forwardly; the platen roller gear is rotated forwardly to pass the recording paper through the recording means when the switching mechanism is in the first operation position and the output shaft is rotated reversely; the white roller gear is rotated forwardly and simultaneously the platen roller gear is rotated forwardly to pass the recording paper through the recording means, when the switching mechanism is in the second operation position and the output shaft is rotated reversely; and the platen roller gear is rotated reversely to feed the recording paper backwards when the switching mechanism is in the second operation position and the output shaft is rotated forwardly.

When recording is effected on recording paper by using the recording paper feeding apparatus of the present invention, recording paper is passed through the recording means and recording is effected on the recording paper by a printing head of the recording means. When an image on an original is read, the original is passed through the original read means and the image is read by a original read sensor of the read means.

The rotation of the platen roller of the recording means and the rotation of the white roller of the original read means is controlled by the forward rotation or reverse rotation of one motor and the operation mode selection means for transmitting the forward/reverse rotation of the motor via transmission means.

The output shaft of the motor is rotated forwardly or reversely. The operation mode selection means including a relay mechanism for transmitting a torque from the transmission means selectively to at least one of the platen roller gear and the white roller gear, and a switching mechanism having first and second operation positions which are selected to control the selection operation of the relay mechanism.

According to the operation mode selection means, the white roller gear is rotated forwardly when the switching mechanism is in the first operation position and the output shaft is rotated forwardly. The platen roller gear is rotated forwardly to pass the recording paper through the recording means when the switching mechanism is in the first operation position and the output shaft is rotated reversely. The white roller gear is rotated forwardly and simultaneously the platen roller gear is rotated forwardly to pass the recording paper through the recording means, when the switching mechanism is in the second operation position and the output shaft is rotated reversely. Further, the platen roller gear is rotated reversely to feed backwards the recording paper clamped between the roller and the printing head, when the switching mechanism is in the second operation position and the output shaft is rotated forwardly.

According to the recording paper feeding apparatus of the present invention, the platen roller can be reversely rotated to feed recording paper backwards, in the reception operation mode and copy operation mode in which recording is effected on the recording paper. Thereby, a marginal delivery end portion of recording paper can be reduced. Thus, a useless portion of recording paper can be reduced when a recording paper roll is used, and a recording range can be increased when continuous form recording paper is used. In addition, only one motor is used as a driving source for feeding recording paper and originals in the back-feed operation mode, transmission operation mode, reception operation mode and copy operation mode.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a vertical cross-sectional view showing schematically the portable facsimile apparatus shown in FIG. 2;

FIG. 4 is a perspective view showing schematically a recording paper roll of the portable facsimile apparatus shown in FIG. 2 and a pair of shaft members for supporting both ends of the paper roll;

FIG. 5 is a perspective view showing schematically continuous form recording paper folded in units of a predetermined length;

FIG. 11 is a perspective view showing schematically the external appearance of the operation mode selection means of the recording paper feeding apparatus shown in FIG. 6.

DETAILED DESCRIPTION OF THE PREFERRED EMBODIMENTS

An embodiment and modifications of the present invention will now be described with reference to FIGS. 1 to 11.

Figure 1:
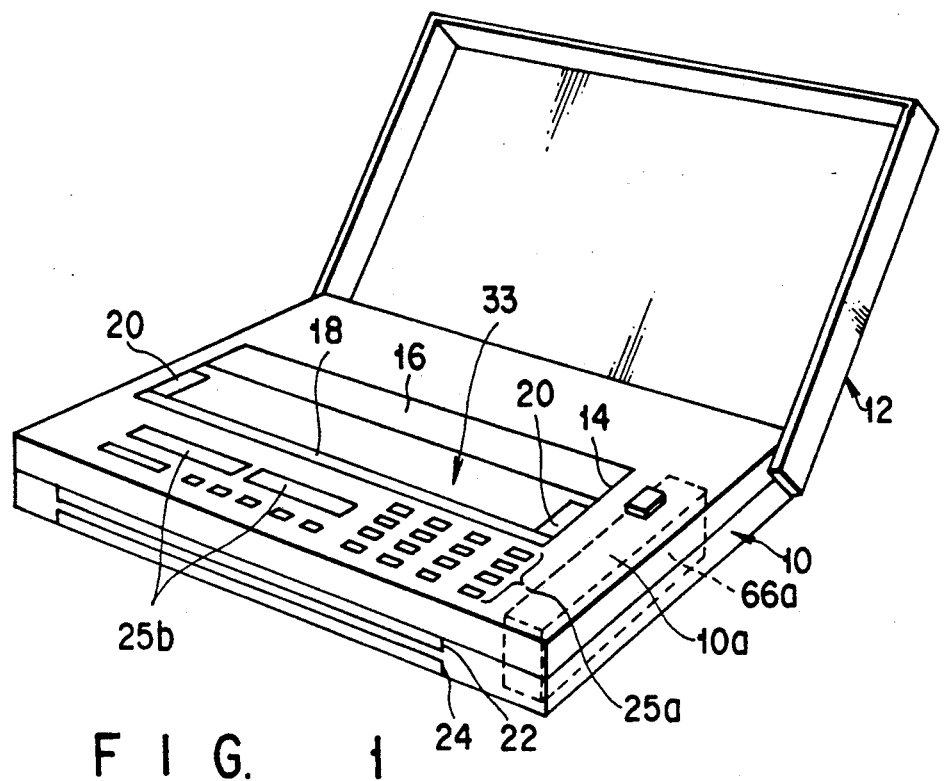
FIG. 1 is a perspective view showing the external appearance of a portable facsimile apparatus wherein a recording paper feeding apparatus according to an embodiment of the present invention is mounted.
Figure 2:
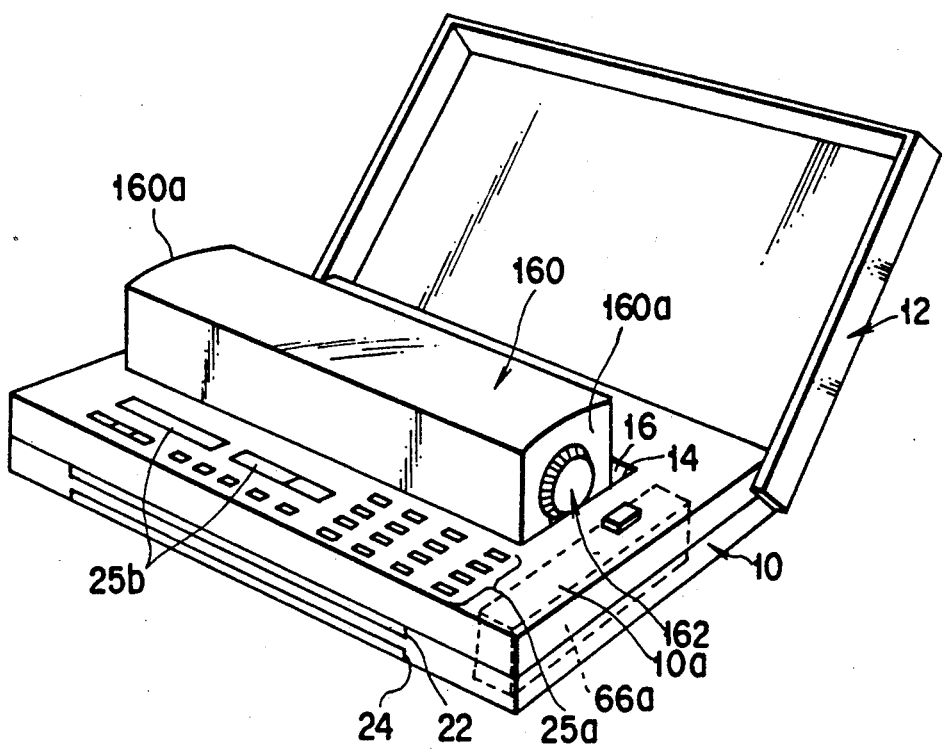
FIG. 2 is a perspective view showing the external appearance of the portable facsimile apparatus shown in FIG. 1, wherein a cover member in which a recording paper roll is rotatably supported by a pair of shaft members is detachably attached on a recording paper mounting portion on the upper surface of the body casing.
Figure 6:
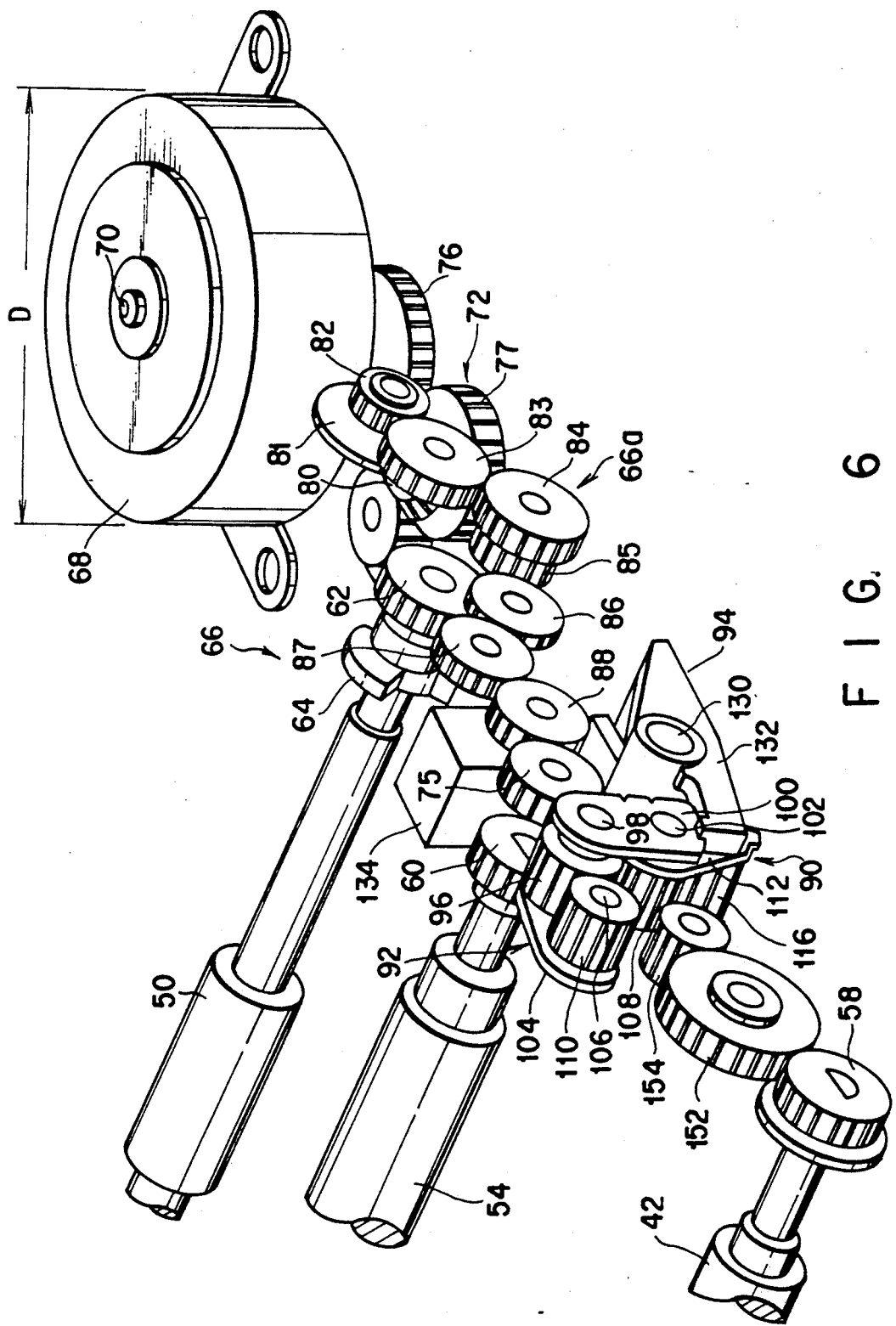
FIG. 6 is a perspective view showing schematically the external appearance of a recording paper feeding apparatus according to an embodiment of the invention.

FIGS. 1 and 2 show schematically the external appearance of a portable facsimile apparatus functioning as a recording apparatus. FIG. 3 is a vertical cross-sectional view of the portable facsimile apparatus shown in FIG. 2, in the state wherein recording paper roll is mounted on a recording paper mounting unit on the upper surface of a body casing. This portable facsimile apparatus can transmit image signals, and copy an original.

A body casing 10 of the portable facsimile apparatus has a notebook-like shape. A body cover 12 for covering an upper surface 10a of the body casing 10 is openably attached to the body casing 10. The body cover 12 is rotated about rear end portions at both sides of the body casing 10. The cover 12 is rotatable between a closed position where the cover 12 covers the upper surface 10a of the body casing 10, and an open position (FIG. 1) where the cover 12 is moved away from the upper surface 10a and inclined towards the rear side of the body casing 10.

An elongated original insertion hole (an hole into which recording paper with an image is inserted) is formed at a center region of the upper surface 10a of the casing 10. The original insertion hole 14 is elongated laterally, as viewed from the front side of the casing 10. The insertion hole 14 is closed by an openable cover 16 having the same shape as this hole 14. In FIGS. 1 to 3, the cover 16 is situated horizontally to be flush with the upper surface 10a of the body casing 10, thereby closing the original insertion hole 14. The cover 16 is rotatable about rear end portions of both longitudinal end portions of the cover 16. The cover 16 can be opened away from the upper surface 10a and inclined towards the rear side of the upper surface 10a.

An elongated recording paper insertion hole 18 parallel to the original insertion hole 14 is formed in front of the original insertion hole 14 on the upper surface 10a of the body casing 10.

A pair of stop levers 20 are disposed at rear end portions of both longitudinal end portions of the recording paper insertion hole 18. Each lever 20 is rotatable about its front end portion between a horizontal position (FIG. 1) where the lever 20 is flush with the upper surface 10a of the body casing 10 and an upright position (FIG. 3; a two-dot-and-dash line) where the lever 20 is raised upright from the upper surface 10a.

The front end surface of the body casing 10 is provided with a recording paper discharge hole 22 and an original discharge hole 24 which are separated in parallel in the vertical direction. Recording paper cutting means (not shown) is disposed in the recording paper discharge hole 22. The recording paper cutting means may be formed at the upper edge of the recording paper discharge hole 22, so that the recording paper discharged from the discharge hole 22 may be pulled upwards and cut off.

Various input keys 25a for controlling the facsimile apparatus and a liquid crystal display 25b for displaying predetermined information are provided in front of the recording paper insertion hole 18 on the upper surface 10a of the body casing 10.

A region in rear of the recording paper insertion hole 18 on the upper casing 10a of the casing 10 is used as a recording paper mounting portion 33.

As is shown in FIG. 3, an electric unit 26 including various electric and electronic parts is disposed in the rear inner space in the body casing 10. In addition, a wiring board 28 is disposed within the rear inner space on the inner surface of the bottom wall of the body casing 10. The wiring board 28 is situated below the electric unit 26.

An original guide passageway 30a running from the original insertion hole 14 to the original discharge hole 24 is provided in the inner space of the body casing 10. The guide passageway 30a is constituted by a plurality of guide members 30. Further, in the inner space, there is provided a recording paper guide passageway 32a extending from the recording paper insertion hole 18 to the recording paper discharge hole 22. The passageway 32a is also constituted by a plurality of guide members 32.

Original supply means 34, original read means 36, paper sheet end detecting means (not shown), etc. are arranged along the original guide passageway 30a within the inner space of the body casing 10. In addition, a recording paper sensor 38, a thermal printing head 40 which is one type of recording head, a platen roller 42 cooperating with the printing head 40, etc. are arranged in the inner space along the recording paper guide passage 32a.

The original supply means 34 includes an ADF (auto document feeder) roller 50, shown in FIGS. 6 to 10, and a separating plate 51 contacting the peripheral surface of the roller 50. The cover 16 of the original insertion hole 14 is opened, and a plurality of originals 166, which are stacked, as shown in FIG. 3 by two-dot-and-dash lines, are inserted in the original insertion hole 14. The original supply means 34 feeds the lowermost original 166a, which is in contact with the ADF roller 50, one by one towards the original read means 36 by means of the roller 50. Feeding of the originals superposed on the lowermost original 166a is prevented by the separating plate 51. The original 166 is, for example, recording paper with images such as handwritten manuscripts, printed matters or drawings.

The original read means 36 includes an original read sensor 52 and a white roller 54, as shown in FIGS. 7 to 10. The original read sensor 52 for reading images on the originals 166 is of the close-contact type. The white roller 54 has a white peripheral surface, and the peripheral surface is put in contact with the original read sensor 52.

The image read by the original read sensor 52 is converted to a corresponding image signal by the electric unit 26. The image signal is transmitted to recording means 56 of the present facsimile apparatus or to another facsimile apparatus (not shown) connected to the present facsimile apparatus via a telephone line (not shown).

The recording means 56 comprises the printing head 40 and platen roller 42. The printing head 40 is put in contact with the platen roller 42.

The platen roller 42, white roller 54 and ADF roller 50 are parallel to each other. Both end portions of each of these rollers are rotatably supported on a support member such as a frame (not shown) built in the body casing 10.

A platen roller gear 58 is fixed to one axial end portion of the platen roller 42. The gear 58 and platen roller 42 are rotatable as one body. A white roller gear 60 is fixed to one axial end portion of the white roller 54. The gear 60 and white roller 54 are rotatable as one body. An ADF roller gear 62 is coupled to one axial end portion of the ADF roller 50 via a one-way clutch 64 shown in FIG. 6. When the ADF roller gear 62 is rotated in a direction in which the one-way clutch 64 is operated, the ADF roller 50 and gear 62 can rotate as one body.

A recording paper feeding apparatus 66 for feeding recording paper, as shown in FIGS. 6 to 11, includes the original supply means 34, original read means 36 and recording means 56.

The apparatus 66 has a motor 68 as a single driving source. The motor 68 is a stepping motor having a forwardly/reversely rotatable output shaft 70. As is shown in FIGS. 6 to 11, the motor 68 has a drum-shape with a diameter D greater than its thickness.

A gear train 72 functioning as means for transmitting forward/reverse rotation of the output shaft 70 is connected to, for example, a lower end portion of the vertically situated output shaft 70. The gear train 72 includes an input gear 74 fixed to the output shaft 70, a first output gear 75 functioning as a final gear, and idler gears 76 to 88 arranged between both gears 74 and 75. The idler gears 76 to 88 transmit rotation of the input gear 74 to the first output gear 75 successively. The gears 80 and 81 are bevel gears, and the other gears 74 to 79 and 82 to 89 are spur gears.

The idler gear 86 of the gear train 72 is provided with a second output gear 89 which rotates along with the gear 86. The gear 89 is meshed with the ADF roller gear 62.

The recording paper feeding apparatus 66 includes an operation mode selection means 90, as shown in FIGS.

6 to 11. The selection means 90 is provided between the platen roller gear 58 and white roller gear 60, and includes a relay mechanism 92 and a switching mechanism 94.

The relay mechanism 92 comprises a driving gear 96, a first gear support shaft 98, a first swing arm 100, a second gear support shaft 102, a second swing arm 104, a third gear support shaft 106, a first driven gear 108, a second driven gear 110, a third swing arm 112, a fourth gear support shaft 114, a third driven gear 116, an engaging portion receiver 118, a first stopper 120, a second stopper 122 and a third stopper 124.

Specifically, the first gear support shaft 98 has a first end portion 98a and a second end portion 98b, and is situated horizontally. The driving gear 96 is rotatably supported between both end portions 98a and 98b of the support shaft 98. The driving gear 96 is meshed with the first output gear 75 of the gear train 72.

The first swing arm 100 is rotatably supported at the first end portion 98a of the first gear support shaft 98, and the second swing arm 104 is rotatably supported at the second end portion 98b of the support shaft 98.

The second gear support shaft 102 is attached to a free end portion of the first swing arm 100. The second gear support shaft 102 is parallel to the first gear support shaft 98. The first driven gear 108 is rotatably supported on the second gear support shaft 102. The first driven gear 108 is always meshed with the driving gear 96. The first driven gear 108 can revolve around the driving gear 96 by the rotation of the first driven gear 108 itself which follows the driving gear 96.

The third gear support shaft 106 is attached to a free end portion of the second swing arm 104. The third gear support shaft 106 is parallel to the first gear support shaft 98. The second driven gear 110 is rotatably supported on the third gear support shaft 106. The second driven gear 110 is always meshed with the driving gear 96. The second driven gear 110 can revolve around the driving gear 96 by the rotation of the second driven gear 110 itself which follows the driving gear 96.

The third swing arm 112 is rotatably supported on the second gear support shaft 102. The fourth gear support shaft 114 is attached to a free end portion of the third swing arm 112. The fourth gear support shaft 114 is parallel to the second gear support shaft 102. The third driven gear 116 is rotatably supported on the fourth gear support shaft 114. The third driven gear 116 is always meshed with the first driven gear 108. The third driven gear 116 can revolve around the first driven gear 108 by the rotation of the third driven gear 116 itself which follows the first driven gear 108.

The engaging portion receiver 118 is provided at a free end portion of the first swing arm 100. The receiver 118 is a recess. The first stopper 120 is provided at one-side edge of a longitudinally middle portion of the first swing arm 100 The stopper 120 is formed by bending a projection projecting integrally from the one-side edge of the longitudinally middle portion of the first swing arm 100 in the thickness direction of the arm 100. In the back-feed operation mode of the apparatus 66, the first stopper 120 abuts against the third swing arm 112 to stop the movement of the arm 112.

A projection 112a is provided on a free end portion of the third swing arm 112. The second stopper 122 is situated near the third swing arm 112. In the copy operation mode of the apparatus 66, the projection 112a abuts against the second stopper 122. The third stopper 124 is situated near the second swing arm 104. In the transmission operation mode and back-feed operation mode of the apparatus 66, the second swing arm 104 abuts against the third stopper 124 to stop the movement of the arm 104.

The switching mechanism 94 is provided to stop, or release the stop of, the movement of the first driven gear 108 around the driving gear 96. The switching mechanism 94 includes a support shaft 130, a lever 132, a solenoid 134 and an idler gear 126.

Specifically, the support shaft 130 is situated horizontally below the first output gear 75. As is shown in FIGS. 7 to 10, the idler gear 126 is rotatably supported on the support shaft 130. The idler gear 126 is always meshed with the white roller gear 60.

A middle portion of the lever 132 is rotatably provided at one axial end portion of the support shaft 130, so that the lever 132 can seesaw on the support shaft 130. A front end portion of the lever 132 is integrally provided with a upward projection 136 functioning as an engaging portion. The projection 136 is engaged with, and disengaged from, the recess 118 of the first swing arm 100 in accordance with the seesaw motion of the lever 132. A rear end portion of the lever 132 has an engaging groove 138 opening backwards.

The solenoid 134 is situated in rear of the relay mechanism 92. The solenoid 134 has a plunger 140 projecting downwards, and a spring (not shown) for constantly urging the plunger 140 downwards. A pin 142 is provided on a lower end portion of the plunger 140. The pin 142 is inserted in the engaging groove 138. The spring (not shown) urges the plunger 140 downwards, thereby holding the switching mechanism 94 at the first operation position where the engaging portion 136 is engaged with the engaging portion receiver 118. The solenoid 134, when excited, pulls up the plunger 140, thereby holding the switching mechanism 94 at the second operation position where the engaging portion 136 is disengaged from the engaging portion receiver 118.

The recording paper feeding apparatus 66 has mutually meshed idler gears 152 and 154 which are arranged between the platen roller gear 58 and relay mechanism 92, as shown in FIGS. 6 to 10. The front-side idler gear 152 is always meshed with the platen roller gear 58. The rear-side idler gear 154 is situated near the first and second driven gears 108 and 110. Either of the first and second driven gears 108 and 110 is detachably meshed with the idler gear 154.

In the recording paper feeding apparatus 66, a driving system 66a is constituted by the platen roller gear 58, white roller gear 60, ADF roller gear 62, one-way clutch 64, motor 68, gear train 72, operation mode selection means 90 and idler gears 152 and 154. The driving system 66a is situated on one side in the width direction of the body casing 10, as shown in FIGS. 1 and 2.

Those structural elements of the driving system 66a, which must not be moved, for example, the motor 68, driving gear 96, support shaft 130, stoppers 122 and 124 and solenoid 134, are fixed on the aforementioned frame (not shown).

In the recording paper feeding apparatus 66, the recording means 56, original read means 36, gear train 72, operation mode selection means 90 and original supply means 34 are contained in a space Z between upper and lower horizontal lines X and Y shown in FIGS. 7 to 10. The upper horizontal line X extends along the inner surface of the upper wall of the body casing 10, and the lower horizontal line Y extends along the inner surface of the bottom wall of the body casing 10. The drum-shaped stepping motor 68 and its fixing bracket (not shown) are disposed within the range of height H of the space Z. The respective means 56, 33, 34 and 90 and gear train 72 are substantially contained in the range of height h of the stepping motor 68 including the fixing bracket.

By this structure, the substantial maximum thickness of the recording paper feeding apparatus 66 can be defined by the height H of the stepping motor 68. Thus, the vertical space occupied by the apparatus 66 in the casing 10 can be reduced. Accordingly, the body casing 10 can be made thin, and the portability of the facsimile apparatus can be enhanced.

In order to arrange the recording paper feeding apparatus 66 between the horizontal lines X and Y, the respective elements of the apparatus 66 are developed horizontally. Specifically, as is shown in FIGS. 6 to 10, the motor 68 and recording means 56 are separated in the direction of feeding recording paper 158. The original read means 36 is situated between the motor 68 and recording means 56. In addition, the operation mode selection 90 is situated between the original read means 36 and recording means 56, and the mutually meshed idler gears 152 and 154 functioning as a second transmission mechanism is arranged between the selection means 90 and recording means 56. Further, the gear train 72 is situated between the output shaft 70 of the motor 68 and the relay mechanism 92 of the operation mode selection means 90. The original supply means 34 is disposed between the motor 68 and original read means 36.

Recording paper 158 (e.g. flexible thermosensible paper roll) is used for the portable facsimile apparatus including the above recording paper feeding apparatus 66 (see FIGS. 3 and 4). The paper roll 158 is contained in an elongated cover member 160. A pair of shaft members 162 are detachably supported on both longitudinal end walls of the cover member 160. These shaft members 162 are rotatably provided on both end walls 160a, and a hollow cylindrical shaft 158a of the paper roll 158 is supported between the shaft members 162.

The cover member 160 is detachably fixed to the recording paper mounting portion 33 on the upper surface 10a of the casing 10, by conventional means such as a pair of engaging portions which are frictionally engaged in both ends of the recording paper insertion hole 18. Accordingly, the cover member 160 covers the paper insertion hole 18 and paired stop levers 20.

The stop levers 20 are situated horizontally so as not to interfere with the rotation of the paper roll 158 in the cover member 160, while the cover member 160 is attached to the upper surface 10a of the casing 10.

While part of the paper roll 158 in the cover member 160 is pulled out and guided to the printing head 40 in the casing 10 via the recording paper insertion hole 18, the paper roll 158 is rotatably held by the shaft members 162 and cover member 160 at a predetermined position on the recording paper mounting portion 33 in parallel to the paper insertion hole 18. Thereby, the remaining portion of the paper roll 158 in the cover member 160 is prevented from moving towards the paper insertion hole 18.

FIG. 4 shows the external appearance of the pair of shaft members 162. Each shaft member 162 has a center shaft 162c. One end portion of the center shaft 162c has a frictional engaging portion 162a with a split groove. The engaging portion 162a is inserted into either end opening of the hollow cylindrical shaft 158a. The other end portion of the center shaft 162c has a handle 162b. A disc-shaped flange 162d is concentrically formed at an axial middle portion of the center shaft 162c. The diameter of the flange 162d is slightly greater than the maximum diameter of the recording paper roll 158. The center shaft 162c of shaft member 162 is inserted into either end opening of the hollow cylindrical shaft 158a until the flange 162c abuts on the corresponding end face of the paper roll 158, thus supporting the paper roll 158.

Flexible continuous form recording paper 164 shown in FIG. 5 may be substituted for the paper roll 158, in the state wherein the cover member 160 is removed from the supper surface 10a of the casing 10. When the paper 164 is used, the paired stop levers 20 are situated upright. Front folding edges 164a of the paper 164 are put in contact with the paired stop levers 20, and the paper 164 is mounted on the recording paper mounting portion 33 on the upper surface 10a of the casing 10. Part of the paper 164 is pulled out and guided to the printing head 40 in the casing 10 via the recording paper insertion hole 18.

The operation of the recording paper feeding apparatus 66 included in the portable facsimile apparatus will now be described.

Figure 8:
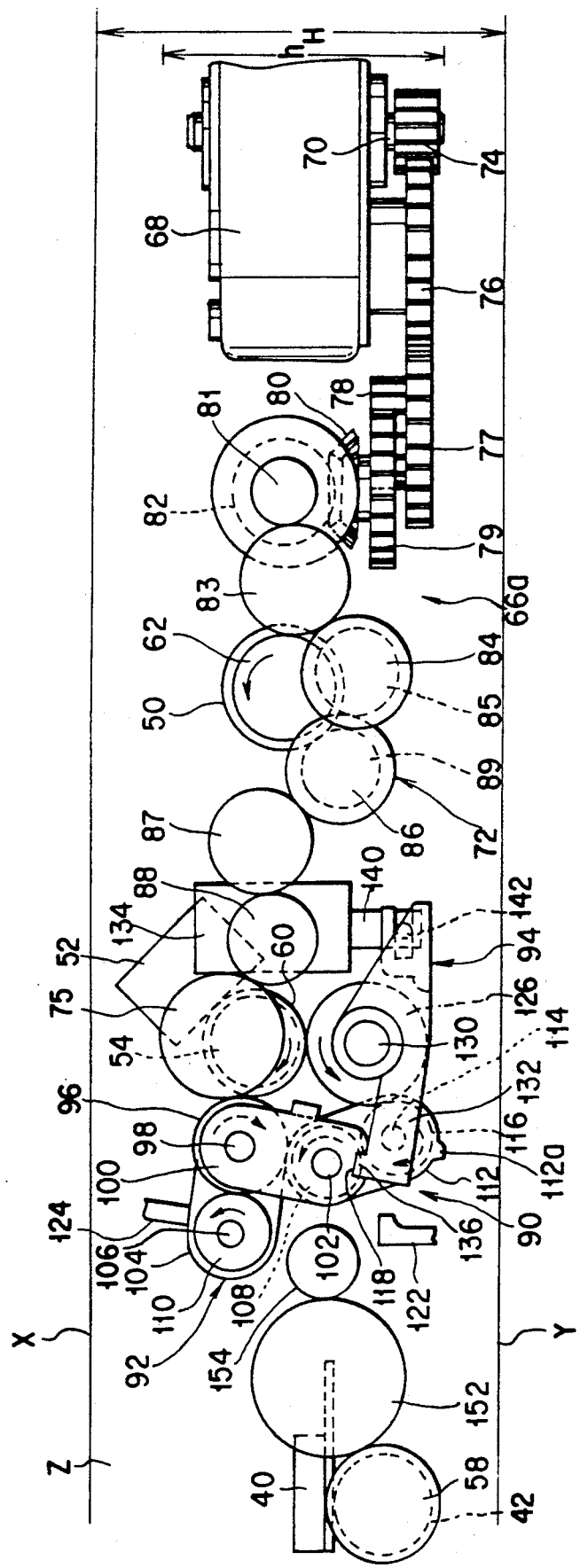
FIG. 8 is a side view showing schematically the recording paper feeding apparatus, shown in FIG. 6, mounted in the portable facsimile apparatus shown in FIG. 2 which is operated in the transmission operation mode.

FIG. 8 illustrates the transmission operation mode of the facsimile apparatus, wherein the white roller 54 and ADF roller 50 are rotated. In FIG. 8, arrows indicate the rotational directions of the respective gears.

In the transmission operation mode, the output shaft 70 of the motor 68 is rotated in one direction (e.g. clockwise) so as to rotate the white roller 54 clockwise (in FIG. 8) and the ADF roller 50 counterclockwise. In this description, the rotation in "one direction" is called "forward rotation", and the rotation in the "opposite direction" is called "reverse direction."

When the output shaft 70 is forwardly rotated, the forward rotation is transmitted to the driving gear 96 form the first output gear 75 which is the final gear of the gear train 72. Simultaneously, the forward rotation is transmitted to the ADF roller gear 62 from the second output gear 89 of the gear train 72. While the output shaft 70 rotates forwardly, the "ON" state of the one-way clutch 64 is maintained. Thus, the forward rotation of the output shaft 70 of motor 68 is transmitted to the ADF roller 50 via the clutch 64, and the ADF roller 50 is forwardly rotated counterclockwise.

On the other hand, the driving gear 96, which receives rotational force, is forwardly rotated clockwise. Accordingly, both the first and second driven rollers 108 and 110 meshed with the driving gear 96 are forwardly rotated counterclockwise. Simultaneously, the first and second driven rollers 108 and 110 tend to be revolved clockwise (i.e. rotational direction of driving gear 96) around the driving gear 96.

However, in the transmission operation mode, the switching mechanism 94 in its first operation position engages its projection 136 with the engaging portion receiver 118 of the first swing arm 100. Thus, the first swing arm 100 is fixed, and the revolution of the first driven gear 108 around the driving gear 96 is stopped. Accordingly, only the second driven gear 110 is moved clockwise in accordance with the rotation of the second swing arm 104 around the third gear support shaft 106. This movement of the second driven gear 110 is stopped when the second swing arm 104 abuts against the third stopper 124.

By the movement of the second driven gear 110, the gear 110 is disengaged from the idler gear 154. Thereby, the second driven gear 110 is revolved around the driving gear 96 to the position where the input of torque to the platen roller gear 58 is stopped. Thus, the platen roller 42 is not rotated.

At this time, the third driven gear 116, which is forwardly rotated clockwise by the rotation of the first driven gear 108, is revolved around the first driven gear 108 in the rotational direction of the gear 108 in accordance with the rotation of the third swing arm 112 about the second gear support shaft 102. Thereby, the third driven gear 116 is meshed with the idler gear 126. The rotation of the driving gear 96 is transmitted to the white roller gear 60 via the first driven gear 108, third driven gear 116 and idler gear 126, thereby forwardly rotating the white roller 54 clockwise.

As described above, in the transmission operation mode, since the ADF roller 50 and white roller 54 are forwardly rotated simultaneously, the original 166 fed from the ADF roller 50 is passed between the white roller 54 and the original read sensor 52. An image on the original 166 is read by the original read sensor 52 and transmitted to another facsimile apparatus (not shown) or the like.

Figure 9:
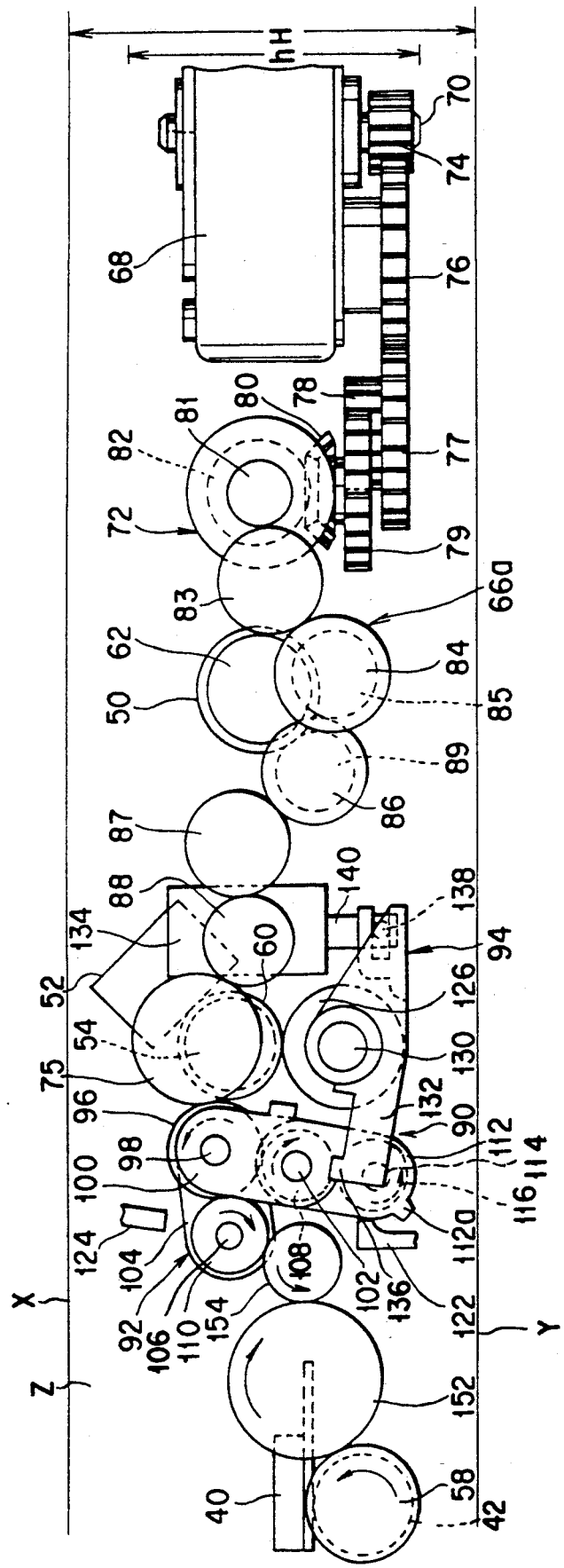
FIG. 9 is a side view showing schematically the recording paper feeding apparatus, shown in FIG. 6, mounted in the portable facsimile apparatus shown in FIG. 2 which is operated in the reception operation mode.

FIG. 9 illustrates the reception operation mode in which the platen roller 42 is rotated forwardly (counterclockwise rotation in FIG. 9 for feeding the paper 158 out from the recording paper discharge hole 22). In FIG. 9, arrows indicate rotational directions of the respective gears.

In the reception operation mode, the switching mechanism 94 is situated in the first operation position, and its projection 136 is engaged with the recess 118 of the first swing arm 100. Thus, the rotation of the first swing arm 100 and the revolution of the first driven gear 108 around the driving gear 96 is stopped.

In this state, the motor 68 is reversely rotated, and this reverse rotation is transmitted to the ADF roller gear 62 via the gear train 72. In this case, however, the one-way clutch 64 is set in the "OFF" state, and the ADF roller gear 72 rotates idly and the ADF roller 50 does not rotate.

On the other hand, the driving gear 96 is reversely rotated counterclockwise via the gear train 72. Thus, the second driven gear 110 is moved counterclockwise in accordance with the rotation of the second swing arm 104 about the third gear support shaft 106. Thereby, the second driven gear 110 is meshed with the idler gear 154. Accordingly, the second driven gear 110 is revolved around the driving gear 96 in a direction opposite to the direction in the transmission operation mode, to the position where the second driven gear 110 transmits torque to the platen roller gear 58 via the idlers 152 and 154.

At this time, the third driven gear 116, which is rotated counterclockwise in accordance with the rotation of the first driven gear 108, is revolved around the first driven gear 108 in the rotational direction of the gear 108 (clockwise) in accordance with the rotation of the third swing arm 112 about the second gear support shaft 102. The movement of the third driven gear 116 is stopped when the third swing arm 112 abuts against the second stopper 122.

Thus, the third driven gear 116 is separated from the idler gear 126. In other words, the third driven gear 116 rotated by the first driven gear 108 is revolved around the first driven gear 108 in a direction opposite to the direction in the transmission operation mode, to the position where the input of torque to the white roller gear 60 is stopped.

More specifically, in the reception operation mode, the platen roller 42 is forwardly rotated, and the recording paper 158 is passed between the roller 42 and the printing head 40. An image corresponding to the received image signal is recorded on the recording paper 158 by the printing head 40.

Figure 10:
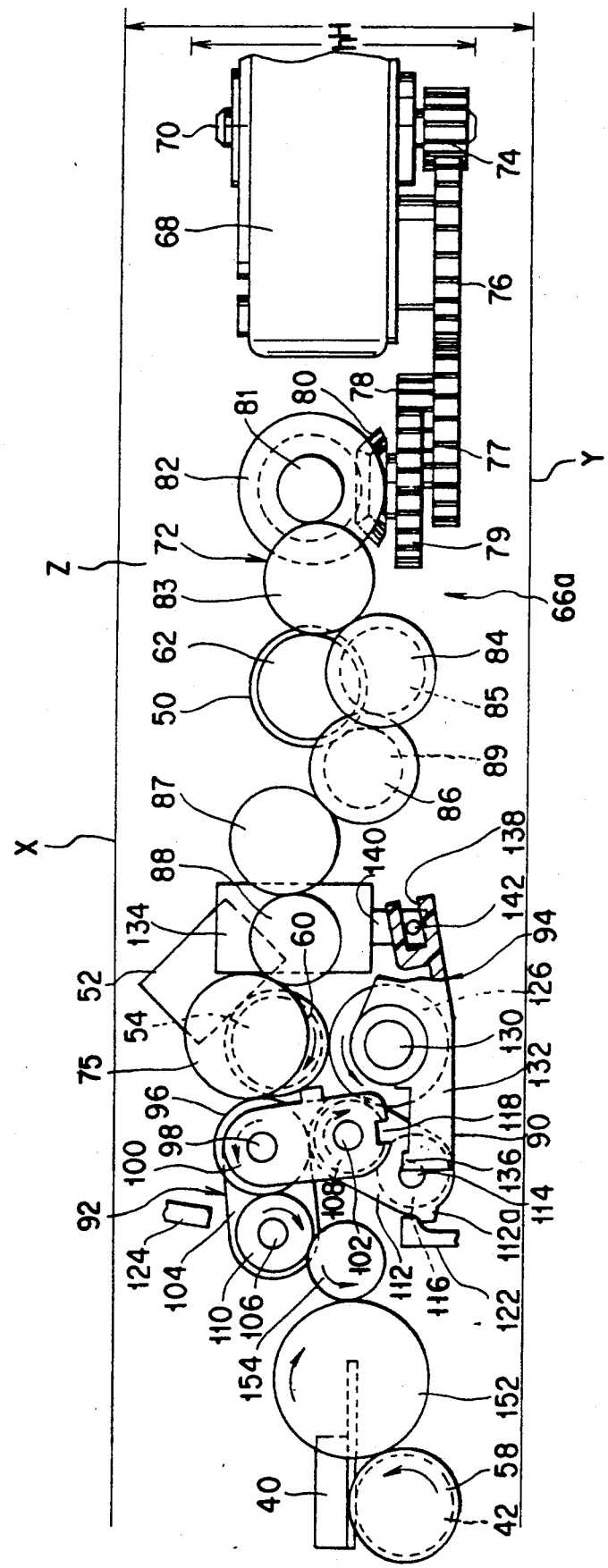
FIG. 10 is a side view showing schematically the recording paper feeding apparatus, shown in FIG. 6, mounted in the portable facsimile apparatus shown in FIG. 2 which is operated in the copy operation mode.

FIG. 10 illustrates the copy operation mode in which the platen roller 42 and white roller 54 are forwardly rotated simultaneously. In FIG. 10, arrows indicate rotational directions of the respective gears.

In the copy operation mode, the switching mechanism 94 is set in the second operation mode. Specifically, the solenoid 134 is excited and its plunger 140 is raised. The lever 132 is rotated counterclockwise about the support shaft 130. Thereby, the projection 136 is disengaged from the recess 118 of the first swing arm 100, thus allowing movement of the first swing arm 100 and first driven gear 108 around the driving gear 96.

In this state, the output shaft 70 of the motor 68 is reversely rotated, as in the reception operation mode. Thus, as in the reception operation mode, the one-way clutch 64 is let out and the ADF roller gear 62 rotates idly. Consequently, the ADF roller 50 does not rotate. In addition, the driving gear 96 is rotated counterclockwise and the second driven gear 110 is meshed with the idler gear 154.

Accordingly, as in the reception operation mode, a counterclockwise torque is transmitted to the platen roller gear 58 via the gear train 72, driving gear 96, second driven gear 110 and idler gears 154 and 152. Thus, the platen roller 42 is forwardly rotated.

Simultaneously, in the copy operation mode, the first driven gear 108, which has been released from the switching mechanism 94, is moved in the rotational direction of the driving gear 96 (clockwise) in accordance with the rotation of the first swing arm 100 about the second gear support shaft 102. Thus, the first driven gear 108 is meshed with the idler gear 126. In other words, the first driven gear 108 is revolved around the driving gear 96 in the rotational direction of the gear 96 to the position where the first driven gear 108 can transmit a torque to the white roller gear 60.

At this time, the third driven gear 116 which is driven by the first driven gear 108 is revolved around the first driven gear 108 in a direction opposite to the direction in the transmission operation mode, to the position where the input of torque to the white roller gear 60 is stopped. This resolution of the third driven gear 116 is stopped when the third swing arm 112 abuts against the second stopper 122.

Accordingly, in the copy operation mode, the white roller 54 and platen roller 42 are forwardly rotated simultaneously. Then, an image on the original 166 is read by the original read means 36 and an image signal corresponding to the image is supplied to the printing head 40 of the recording means 56. Thus, the image corresponding to the image signal is recorded by the printing head 40 on the recording paper 158 which is passed through the recording means 56. In this manner, the image on the original 166 is recorded on the recording paper 158.

Figure 7:
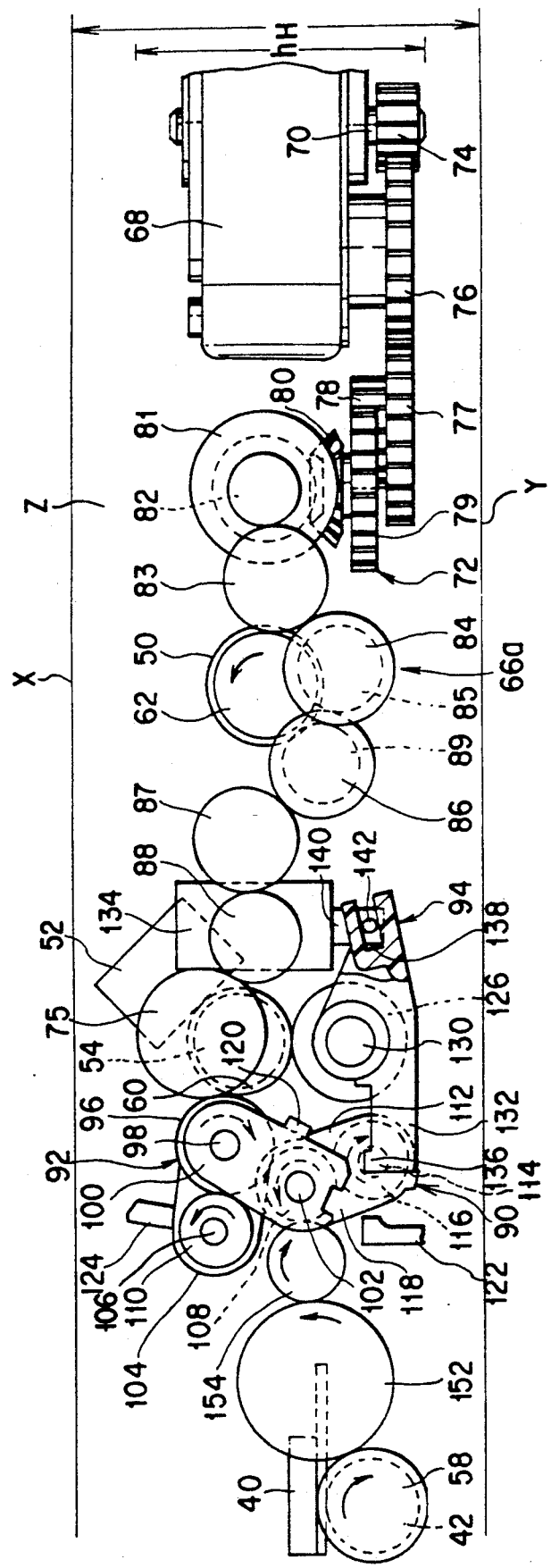
FIG. 7 is a side view showing schematically the recording paper feeding apparatus, shown in FIG. 6, mounted in the portable facsimile apparatus shown in FIG. 2 which is operated in the back-feed operation mode.

FIG. 7 illustrates the back-feed mode in which the platen roller 42 is reversely rotated in the reception operation mode and in the copy operation mode. In FIG. 7, arrows indicate rotational directions of the respective gears.

In the back-feed operation mode, the solenoid 134 of the switching mechanism 94 is excited and the mechanism 94 is set in the second operation position. As has been stated above, the projection 136 is disengaged from the recess 118 of the first swing arm 100 to allow the movement of the first swing arm 100 and the first driven gear 108 around the driving gear 96.

In this state, the output shaft 70 of the motor 68 is rotated in one direction (forward direction), as in the transmission operation mode. Thus, as in the transmission operation mode, the one-way clutch 64 is let in and the ADF roller 50 is rotated along with the ADF roller gear 62. In the back-feed operation mode, however, the original 166 is not inserted and therefore the ADF roller 50 rotates idly.

Simultaneously, the driving gear 96 is rotated clockwise via the gear train 72. Thus, as stated above, the second driven gear 110 is rotated clockwise in accordance with the rotation of the second swing arm 104 about the third gear support shaft 106, and the gear 110 is separated from the idler gear 154. At the same time, the first driven gear 108 released by the switching mechanism 94 is moved in the rotational direction (clockwise) of the driving gear 96 in accordance with the rotation of the first swing arm 110 about the second gear support shaft 102. Thus, the first driven gear 108 is meshed with the idler gear 154. Thereby, the first driven gear 108 is revolved around the driving gear 96 in the rotational direction of the driving gear 96, to the position where the first driven gear 108 can transmit a torque to the platen roller gear 58.

At this time, the third driven gear 116 driven by the first driven gear 108 is revolved around the first driven gear 108 in the rotational direction (counterclockwise) of the gear 108 in accordance with the third swing arm 112 about the fourth gear support shaft 114. Thus, the third driven gear 116 tends to approach the idler gear 126. However, the third swing arm 112 abuts against the first stopper 120 before the third driven gear 116 is put in contact with the idler gear 126. Therefore, the third driven gear 116 is not meshed with the idler gear 126.

Accordingly, in the back-feed mode, the platen roller gear 54 and platen roller 42 can be reversely rotated via the gear train 72, driving gear 96, first driven gear 108 and idler gears 154 and 152. By this rotation, the recording paper 158 clamped between the platen roller 42 and printing head 40 can be fed backwards.

As has been described above, since the recording paper 158 can be fed backwards in the reception operation mode and in the copy operation mode, the marginal delivery end portion of the recording paper 158 can be reduced. Thus, when the recording paper roll 158 is used, image can be recorded in the region corresponding to the distance between the recording paper cutting means (not shown) for cutting the paper 158 and the recording means 56, and useless portion of the paper 158 can be reduced. In addition, when the continuous form recording paper 164 shown in FIG. 5 is used, image can be recorded on the region near the perforated folding edge 164a which is clamped by the recording means 56. Thus, the recording range on the predetermined-sized region between folding edges 164a of the continuous form recording paper 164 can be increased.

The recording paper feeding apparatus 66 for feeding the recording paper 158 and original 166, which must be used in the back-feed operation mode, transmission operation mode, reception operation mode and copy operation mode, requires only one motor 68 as a driving source. Therefore, the recording paper feeding apparatus 66 can be reduced in size and weight.

The present invention is not limited to the above embodiment. For example, the idler gears 152 and 154 may be omitted, or the first and second driven gears 108 and 110 may be put in or out of contact with the platen roller gear 58. Further, the idler gear 126 may be omitted so that the second driven gear 110 is put in or out of contact with the white roller gear 60.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for feeding recording paper, comprising:
   recording means, including a platen roller and a printing head between which recording paper is passed, for effecting recording on the recording paper;
   original read means, including a white roller and an original read sensor between which an original is passed, for reading an image on the original by means of the original read sensor;
   a single motor having a forwardly/reversely rotatable output shaft;
   transmission means connected to the output shaft;
   a platen roller gear fixed on the platen roller;
   a white roller gear fixed on the white roller; and
   operation mode selection means including a relay mechanism, provided between the platen roller gear and the white roller gear, for transmitting a torque from the transmission means selectively to at least one of the platen roller gear and the white roller gear, and a switching mechanism having first and second operation positions which are selected to control the selection operation of the relay mechanism, wherein the white roller gear is rotated forwardly when the switching mechanism is in the first operation position and the output shaft is rotated forwardly; the platen roller gear is rotated forwardly to pass the recording paper through the recording means when the switching mechanism is in the first operation position and the output shaft is rotated reversely; the white roller gear is rotated forwardly and simultaneously the platen roller gear is rotated forwardly to pass the recording paper through the recording means, when the switching mechanism is in the second operation position and the output shaft is rotated reversely; and the platen roller gear is rotated reversely to feed the recording paper backwards when the switching mechanism is in the second operation position and the output shaft is rotated forwardly.

2. The apparatus according to claim 1, wherein said transmission means comprises a gear train.

3. The apparatus according to claim 2, wherein said relay mechanism includes:
   a driving gear constantly meshed with a first output gear of the transmission means;
   a first driven gear constantly meshed with the driving gear, said first driven gear being capable of revolving around the driving gear while rotating about its own axis, so that a torque is or is not input to the platen roller gear and the white roller gear;

a second driven gear constantly meshed with the driving gear, said second driven gear being capable of revolving around the driving gear while rotating about its own axis, so that a torque is or is not input to the platen roller gear; and a third driven gear constantly meshed with the first driven gear, said third driven gear being capable of revolving around the first driven gear while rotating about its own axis, so that a torque is or is not input to the white roller gear, and wherein said switching mechanism stops movement of the first driven gear in a circumferential direction of the driving gear when the switching mechanism is in the first operation position, and said switching mechanism releases the stop of the first driven gear when the switching mechanism is in the second operation position.

4. The apparatus according to claim 1, wherein said platen roller gear is interlocked with the first driven gear or the second driven gear via a plurality of idler gears provided between the platen roller gears and the relay mechanism.

5. The apparatus according to claim 1, wherein said motor comprises a drum-shaped stepping motor having a vertically extending output shaft.

6. The apparatus according to claim 5, wherein said motor and said recording means are situated apart from each other in a direction of feeding the recording paper, said original read means is situated between the motor and the recording means, and the transmission means is situated between the output shaft of the motor and the relay mechanism.

7. The apparatus according to claim 6, wherein the recording means, the original read means, the transmission means and the operation mode selection means are contained substantially in a range of height of the motor.

8. The apparatus according to claim 2, wherein said relay mechanism includes:
a driving gear constantly meshed with a first output shaft of the transmission means;
a first stationary gear support shaft having one end portion and the other end portion between which said driving gear is rotatably supported;
a first swing arm supported rotatably at said one end portion of the first gear support shaft;
a second gear support shaft attached to a free end portion of the first swing arm in parallel to the first gear support shaft;
a second swing arm supported rotatably at said other end portion of the first gear support shaft;
a third gear support shaft attached to a free end portion of the second swing arm in parallel to the first gear support shaft;
a first driven gear constantly meshed with the driving gear and supported rotatably on the second gear support shaft, said first driven gear being capable of revolving around the driving gear while rotating about its own axis, so that a torque is or is not input to the platen roller gear and the white roller gear;
a second driven gear constantly meshed with the driving gear and supported rotatably on the third gear support shaft, said second driven gear being capable of revolving around the driving gear while rotating about its own axis, so that a torque is or is not input to the platen roller gear;
a third swing arm supported rotatably on the second gear support shaft;
a fourth gear support shaft attached to a free end portion of the third swing arm in parallel to the second gear support shaft;
a third driven gear constantly meshed with the first driven gear and supported rotatably on the fourth gear support shaft, said third driven gear being capable of revolving around the first driven gear while rotating about its own axis, so that a torque is or is not input to the white roller gear;
an engaging portion receiver provided at the free end portion of the first swing arm;
a first stopper provided at a longitudinal middle portion of the first swing arm and being engageable with and disengageable from the third swing arm;
a second stopper provided near the third swing arm, said second stopper being put in and out of contact with the third swing arm; and
a third stopper provided near the second swing arm, said third stopper being put in and out of contact with the second swing arm, and
wherein said switching mechanism includes:
a stationary support shaft;
a lever provided at the support shaft and seesawing on the support shaft;
an engaging portion provided at one end portion of the lever and being engageable with and disengageable from the engaging portion receiver; and
a solenoid having a plunger coupled to another end portion of the lever, and moving the lever to a first operation position where the engaging portion is engaged with the engaging portion receiver or to a second operation position where the engaging portion is disengaged from the engaging portion receiver.

9. The apparatus according to claim 5, wherein said motor and said recording means are situated apart from each other in a direction of feeding the recording paper, said original read means is situated between the motor and the recording means,
the transmission means is situated between the output shaft of the motor and the relay mechanism, roller gear provided via the one-way clutch are situated between the motor and the original read means, and
said transmission means has a second output gear meshed with the ADF roller gear.

10. The apparatus according to claim 9, wherein the recording means, the original read means, the transmission means, the operation mode selection means and the ADF roller are contained substantially in a range of height of the motor.

11. An apparatus for feeding recording paper, comprising:
a body casing having a recording paper insertion hole, a recording paper discharge hole and an original insertion hole, the recording paper insertion hole and the original insertion hole being located on an upper surface of the casing;
recording means provided within the body casing and including a platen roller and a printing head between which recording paper is passed, for effecting recording on the recording paper;
original read means provided within the body casing and including a white roller and an original read sensor between which an original is passed, for reading an image on the original by means of the original read sensor;

a single motor having a forwardly/reversely rotatable output shaft;

transmission means connected to the output shaft;

a platen roller gear fixed on the platen roller;

a white roller gear fixed on the white roller; and operation mode selection means including a relay mechanism, provided between the platen roller gear and the white roller gear, for transmitting a torque from the transmission means selectively to at least one of the platen roller gear and the white roller gear, and a switching mechanism having first and second operation positions which are selected to control the selection operation of the relay mechanism, wherein the white roller gear is rotated forwardly when the switching mechanism is in the first operation position and the output shaft is rotated forwardly; the platen roller gear is rotated forwardly to pass the recording paper through the recording means when the switching mechanism is in the first operation position and the output shaft is rotated reversely; the white roller gear is rotated forwardly and simultaneously the platen roller gear is rotated forwardly to pass the recording paper through the recording means, when the switching mechanism is in the second operation position and the output shaft is rotated reversely; and the platen roller gear is rotated reversely to feed the recording paper backwards when the switching mechanism is in the second operation position and the output shaft is rotated forwardly, wherein the platen roller gear, the white roller gear, the motor, the transmission means and the operation mode selection means are arranged on one side in a width direction of the body casing.

* * * * *